Patented Aug. 11, 1925.

1,549,136

UNITED STATES PATENT OFFICE.

ARTHUR LACHMAN, OF SAN FRANCISCO, CALIFORNIA.

PROCESS OF MANUFACTURING DIPHENYLAMINE.

No Drawing. Application filed November 23, 1921. Serial No. 517,230.

*To all whom it may concern:*

Be it known that I, ARTHUR LACHMAN, a citizen of the United States, residing at the city and county of San Francisco and State of California, have invented new and useful Improvements in Processes of Manufacturing Diphenylamine, of which the following is a specification.

This invention relates to a process of manufacturing diphenylamine.

It is customary to manufacture diphenylamine by heating aniline with aniline hydrochloride. In recent years it has been found that the latter substance can be replaced by aniline salts of other hal-hydric acids, such as hydro-bromide, or by substances which on heating with aniline yield such hal-hydric salts; e. g. brombenzene, ammonium iodide, ferric chloride.

All of these processes have in common that the materials must be heated to very high temperatures, e. g. 300° C. at high pressures, and that special apparatus, such as an autoclave, must be provided to withstand these severe conditions.

I have found that if the hal-hydric acids in the above illustrations are replaced by acids that are but slightly volatile at temperatures between 200–220° C., it is possible to carry out the process at this temperature and at atmospheric pressure. At this lower temperature, little or no tarry matter is formed as a by-product, and the resulting diphenylamine is practically pure.

Among such acids are sulphuric and phosphoric acid. I have found, however, that better yields are obtained if the acid chosen be one that yields an aniline salt which is fusible at the temperature mentioned, or which forms an aniline salt that fuses or melts at this temperature if mixed with an excess of aniline. Such acids may be found among the derivatives of sulphuric acid, such as benzene sulphonic acid, although other sulphonic acids, such as those of toluene or napththaline may of course also be employed.

It is not necessary to employ the free benzene sulphonic acid, as it may be replaced by an equivalent amount of either its aniline or its ammonium salt; the latter salt, when heated with aniline in excess, readily loses ammonia and forms aniline benzene sulphonate.

As an example of how the process may be carried out 1000 parts of benzene sulphonic acid and 2500 parts of aniline are placed in a still, and heat is applied until the mixture boils gently. The vapors which pass over consist of a mixture of ammonia and aniline, which are condensed and separated by a suitable condenser. From time to time the recovered aniline is returned to the still. This gentle boiling is continued for about 72 hours. Thereupon the heat is increased, and the bulk of the unconverted aniline is distilled off, care being taken not to heat the still contents above 220–230° C., to avoid decomposition of the benzene sulphonic acid. The still contents, consisting of a mixture of diphenylamine, the aniline salt of benzene sulphonic acid, and a small amount of aniline, may be separated by any suitable means. What really takes place during the process is that a small amount of aniline salt acts as a catalyzer, i. e. the ammonium salt which is produced as a result of the reaction is decomposed by further quantities of aniline thus yielding ammonia which passes off as a gas and aniline salt which enters into reaction with the free or unconverted aniline returned from the condenser. The final yield is in this manner large when comparison is made with the varying methods heretofore referred to. The entire process may be carried out under low temperatures, thus avoiding the formation of tarry by-products, and as atmospheric pressure is maintained, any ordinary still and condenser may be employed.

Having thus described my invention, what I claim and desire to secure by Letters Patent is—

1. The process of manufacturing diphenylamine from aniline which consists in heating aniline with benzene sulphonic acid.

2. The process of manufacturing diphenylamine from aniline which consists in heating a mixture of aniline and benzene sulphonic acid in a still to a temperature of approximately 200° C. and maintaining said mixture under substantially atmospheric pressure, condensing the ammonia and aniline vapors escaping during the reaction and returning the condensed aniline to the still until a large part of the aniline has been converted into diphenylamine.

ARTHUR LACHMAN.